(12) United States Patent
Takahashi (10) Patent No.: US 11,533,009 B2
(45) Date of Patent: Dec. 20, 2022

(54) MOTOR CONTROL DEVICE

(71) Applicant: ADVICS CO., LTD., Kariya (JP)

(72) Inventor: Atsushi Takahashi, Okazaki (JP)

(73) Assignee: ADVICS CO., LTD., Kariya (JP)

( * ) Notice: Subject to any disclaimer, the term of this patent is extended or adjusted under 35 U.S.C. 154(b) by 44 days.

(21) Appl. No.: 17/273,483

(22) PCT Filed: Sep. 24, 2019

(86) PCT No.: PCT/JP2019/037232
§ 371 (c)(1),
(2) Date: Mar. 4, 2021

(87) PCT Pub. No.: WO2020/066994
PCT Pub. Date: Apr. 2, 2020

(65) Prior Publication Data
US 2021/0367541 A1 Nov. 25, 2021

(30) Foreign Application Priority Data
Sep. 26, 2018 (JP) .............................. JP2018-180125

(51) Int. Cl.
*H02M 1/36* (2007.01)
*H02P 21/00* (2016.01)
(Continued)

(52) U.S. Cl.
CPC .......... *H02P 21/0089* (2013.01); *H02P 21/22* (2016.02); *H02P 21/26* (2016.02)

(58) Field of Classification Search
CPC ...... H02P 21/26; H02P 21/22; H02P 21/0089; H02M 1/36
See application file for complete search history.

(56) References Cited

U.S. PATENT DOCUMENTS

| 2012/0242262 A1* | 9/2012 | Atarashi | H02P 27/06 318/400.3 |
| 2017/0093324 A1* | 3/2017 | Saha | H02M 1/36 |
| 2018/0191283 A1 | 7/2018 | Aoyagi et al. | |

FOREIGN PATENT DOCUMENTS

JP 2017017909 A 1/2017

OTHER PUBLICATIONS

International Search Report (PCT/ISA/210) dated Dec. 17, 2019, by the Japan Patent Office as the International Searching Authority for International Application No. PCT/JP2019/037232.

(Continued)

*Primary Examiner* — Cortez M Cook
(74) *Attorney, Agent, or Firm* — Buchanan Ingersoll & Rooney PC (57) ABSTRACT

A motor control device includes a current acquisition unit that acquires a limit current allowed to flow from a battery to a brushless motor, a voltage acquisition unit that acquires a power supply voltage applied from the battery to the brushless motor, and a command current determination unit that determines a d-axis command current and a q-axis command current. The command current determination unit determines the d-axis command current and the q-axis command current based on a power limit circle which is a current characteristic on a d-axis and a q-axis based on an inner product of a voltage vector and a current vector and a voltage limit circle which is a current characteristic on the d-axis and the q-axis based on the power supply voltage and an angular velocity of the brushless motor.

10 Claims, 6 Drawing Sheets

(51) Int. Cl.
*H02P 21/22* (2016.01)
*H02P 21/26* (2016.01)

(56) References Cited

OTHER PUBLICATIONS

Written Opinion (PCT/ISA/237) dated Dec. 17, 2019, by the Japan Patent Office as the International Searching Authority for International Application No. PCT/JP2019/037232.

* cited by examiner

MOTOR CONTROL DEVICE

TECHNICAL FIELD

The present disclosure relates to a motor control device that controls a brushless motor.

BACKGROUND ART

In general, a motor control device that drives a brushless motor by vector control is known. In the vector control, the d-axis command current, which is a current command value in a d-axis direction of rotating coordinates, and a q-axis command current, which is a current command value in a q-axis direction, are calculated. Then, the brushless motor is driven through control of an inverter based on the d-axis command current and the q-axis command current.

For example, in PTL 1, the d-axis command current is calculated so as not to exceed a power limit circle determined from a current characteristic on a d-axis and a q-axis based on input power to the brushless motor and a current flowing through the brushless motor.

CITATION LIST

Patent Literature

PTL 1: JP-A-2017-17909

SUMMARY

Technical Problem

Depending on the angular velocity of the brushless motor, even when the brushless motor is controlled based on the d-axis command current and the q-axis command current calculated so as not to exceed the power limit circle, a d-axis current indicating a current component flowing in the d-axis direction may diverge from the d-axis command current, or a q-axis current indicating a current component flowing in the q-axis direction may diverge from the q-axis command current. In this case, there is concern that an output torque of the brushless motor may be lower than a required torque, or a rotation velocity of a rotor may be lower than a required value of the rotation velocity.

Solution to Problem

A motor control device for solving the above-mentioned problem is a device that drives a brushless motor based on a d-axis command current which is a current command value in a direction of a d-axis of rotating coordinates of vector control, and a q-axis command current which is a current command value in a direction of a q-axis of the rotating coordinates. The motor control device includes a current acquisition unit that acquires a current flowing through the brushless motor by supplying power from a power supply, a voltage acquisition unit that acquires a power supply voltage applied to the brushless motor from the power supply, and a command current determination unit that determines the d-axis command current and the q-axis command current. The command current determination unit determines the d-axis command current and the q-axis command current based on a power limit circle which is a current characteristic on the d-axis and the q-axis based on an inner product of a voltage vector including a voltage component in the direction of the d-axis and a voltage component in the direction of the q-axis and a current vector including a current component in the direction of the d-axis and a current component in the direction of the q-axis obtained from a current flowing through the brushless motor, and a voltage limit circle which is a current characteristic on the d-axis and the q-axis based on the power supply voltage and an angular velocity of the brushless motor.

Even when the power supply voltage is held at a certain value, if the angular velocity of the brushless motor changes, a size of the voltage limit circle changes. Even in a case where the brushless motor is controlled based on the d-axis command current and q-axis command current calculated so as not to exceed the power limit circle, when a point representing the d-axis command current and the q-axis command current is located outside the voltage limit circle in the rotating coordinates, there is concern that the d-axis current indicating the current component flowing in the d-axis direction may diverge from the d-axis command current, or the q-axis current indicating the current component flowing in the q-axis direction may deviate from the q-axis command current.

In this regard, according to the above configuration, the d-axis command current and the q-axis command current are determined in consideration of not only the power limit circle but also the voltage limit circle that changes depending on the angular velocity. For this reason, the point representing the d-axis command current and the q-axis command current in the rotating coordinates can be contained in both the power limit circle and the voltage limit circle. Further, by driving the brushless motor based on the d-axis command current and the q-axis command current, the d-axis current is less likely to diverge from the d-axis command current, and the q-axis current is less likely to diverge from the q-axis command current. Therefore, it is possible to suppress a decrease in controllability of the brushless motor.

DESCRIPTION OF EMBODIMENTS

Hereinafter, an embodiment of a motor control device will be described with reference to FIGS. 1 to 7.

Figure 1:
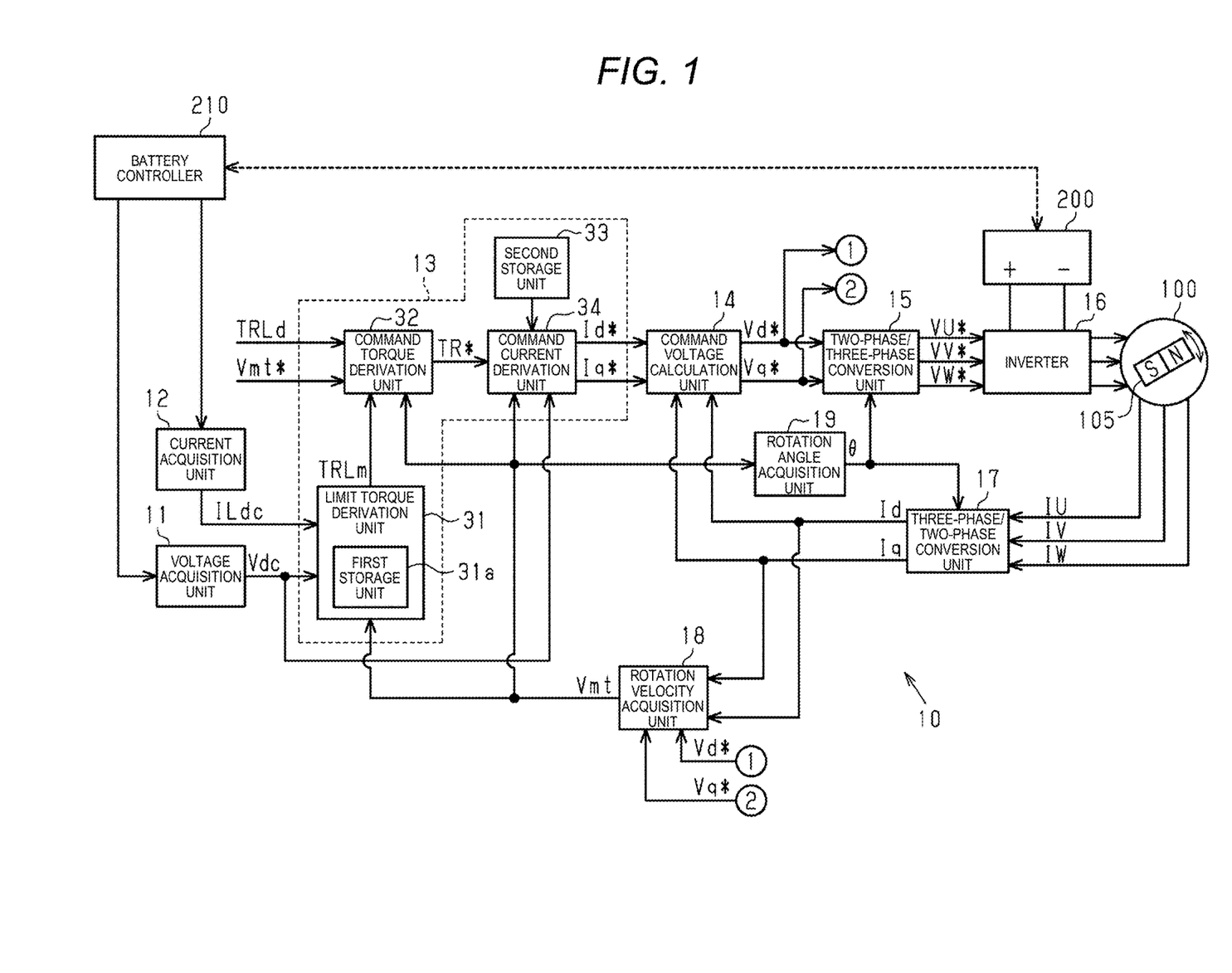
FIG. 1 a schematic configuration diagram illustrating a motor control device of an embodiment and a brushless motor controlled by the motor control device.

FIG. 1 illustrates a motor control device 10 of the present embodiment and a brushless motor 100 controlled by the motor control device 10. The brushless motor 100 is used as a power source for discharging brake fluid in an in-vehicle braking device. The brushless motor 100 is a permanent magnet embedded synchronous motor. The brushless motor 100 includes coils of a plurality of phases (U-phase, V-phase, and W-phase) and a rotor 105 having saliency. Examples of the rotor 105 may include a two-pole rotor in which the north pole and the south pole are magnetized one by one.

The motor control device 10 drives the brushless motor 100 by vector control. Such a motor control device 10 includes a command current determination unit 13, a command voltage calculation unit 14, a two-phase/three-phase conversion unit 15, an inverter 16, a three-phase/two-phase conversion unit 17, a rotation velocity acquisition unit 18, and a rotation angle acquisition unit 19. Further, the motor control device includes a voltage acquisition unit 11 and a current acquisition unit 12 to which information is input from a battery controller 210 that monitors a state of a battery 200. The voltage acquisition unit 11 acquires a power supply voltage Vdc, which is a voltage of the battery 200, based on input information. This power supply voltage Vdc is a voltage that can be applied to the brushless motor 100 through the inverter 16.

Based on information input from the battery controller 210, the current acquisition unit 12 acquires a limit current ILdc, which is an upper limit of a current that can be passed from the battery 200 to the brushless motor 100 via the inverter 16. The limit current ILdc is a value determined by the battery controller 210.

Note that the battery 200 also functions as a power source for another in-vehicle actuator other than the braking device. In a situation where the amount of power supplied from the battery 200 to another in-vehicle actuator is large, the battery controller 210 determines that the amount of power that can be supplied from the battery 200 to the brushless motor 100 is small. For this reason, the battery controller 210 determines the limit current ILdc for the brushless motor 100 based on a mode of supplying power from the battery 200 to various in-vehicle actuators.

Although details are described later, the command current determination unit 13 determines a d-axis command current Id*, which is a command value of a current component in a d-axis direction in rotating coordinates of vector control, and a q-axis command current Iq*, which is a command value of a current component in a q-axis direction in the rotating coordinates. A d-axis and a q-axis are orthogonal to each other in the rotating coordinates.

The command voltage calculation unit 14 calculates a d-axis command voltage Vd* by feedback control based on the d-axis command current Id* and a d-axis current Id. The d-axis current Id is a value indicating a current component of a current vector, which is generated in the rotating coordinates by supplying power to the brushless motor 100, in a direction of an estimated d-axis. Further, the command voltage calculation unit 14 calculates a q-axis command voltage Vq* by feedback control based on the q-axis command current Iq* and a q-axis current Iq. The q-axis current Iq is a value indicating a current component of the current vector, which is generated in the rotating coordinates by supplying power to the brushless motor 100, in a direction of an estimated q-axis.

Note that the estimated d-axis is an axis estimated to be the d-axis of the rotating coordinates. An actual d-axis of the rotating coordinates is referred to as a real d-axis. Further, an actual q-axis of the rotating coordinates is referred to as a real q-axis, and an axis estimated to be the q-axis of the rotating coordinates is referred to as the estimated q-axis.

The two-phase/three-phase conversion unit 15 converts the d-axis command voltage Vd* and the q-axis command voltage Vq* into a U-phase command voltage VU*, a V-phase command voltage VV*, and a W-phase command voltage VW* based on a rotor rotation angle θ which is a rotation angle of the rotor 105. The U-phase command voltage VU* is a command value of a voltage applied to a U-phase coil. The V-phase command voltage VV* is a command value of a voltage applied to a V-phase coil. The W-phase command voltage VW* is a command value of a voltage applied to a W-phase coil.

The inverter 16 includes a plurality of switching elements operated by power supplied from the battery 200. The inverter 16 generates a U-phase signal by the U-phase command voltage VU* input from the two-phase/three-phase conversion unit 15 and ON/OFF operations of the switching elements. Further, the inverter 16 generates a V-phase signal by the input V-phase command voltage VV* and ON/OFF operations of the switching elements. Further, the inverter 16 generates a W-phase signal by the input W-phase command voltage VW* and ON/OFF operations of the switching elements. Then, the U-phase signal is input to the U-phase coil of the brushless motor 100, the V-phase signal is input to the V-phase coil, and the W-phase signal is input to the W-phase coil.

To the three-phase/two-phase conversion unit 17, a U-phase current IU, which is a current flowing through the U-phase coil of the brushless motor 100, is input, a V-phase current IV, which is a current flowing through the V-phase coil thereof, is input, and a W-phase current IW, which is a current flowing through the W-phase coil thereof, is input. Then, the three-phase/two-phase conversion unit 17 converts the U-phase current IU, the V-phase current IV, and the W-phase current IW into the d-axis current Id, which is a current component in the d-axis direction, and the q-axis current Iq, which is a current component in the q-axis direction, based on the rotor rotation angle θ.

The rotation velocity acquisition unit 18 acquires a rotor rotation velocity Vmt, which is a rotation velocity of the rotor 105. Examples of a method of acquiring the rotor rotation velocity Vmt may include an induced voltage method. In this case, the rotation velocity acquisition unit 18 calculates a phase difference Δθ between a direction of the real d-axis and a direction of the estimated d-axis based on the d-axis command voltage Vd*, the q-axis command voltage Vq*, the d-axis current Id, and the q-axis current Iq. Then, the rotation velocity acquisition unit 18 obtains the rotor rotation velocity Vmt as the rotation velocity of the rotor 105 by proportionally integrating the calculated phase difference Δθ.

The rotation angle acquisition unit 19 acquires the rotor rotation angle θ. For example, the rotation angle acquisition unit 19 obtains the rotor rotation angle θ by integrating the rotor rotation velocity Vmt.

Figure 2:
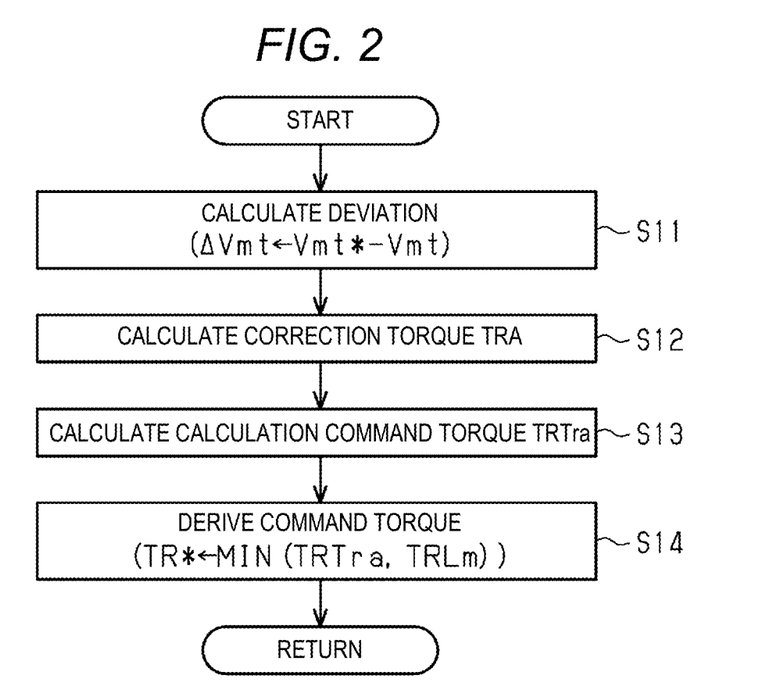
FIG. 2 is a flowchart for description of a processing routine executed when deriving a command torque.

Next, the command current determination unit 13 will be described in detail with reference to FIGS. 1 and 2.

As illustrated in FIG. 1, the command current determination unit 13 includes a limit torque derivation unit 31, a command torque derivation unit 32, a second storage unit 33, and a command current derivation unit 34.

The limit torque derivation unit 31 derives a limit torque TRLm which is a limit value of a torque for the brushless motor 100 based on the power supply voltage Vdc acquired by the voltage acquisition unit 11, the limit current ILdc acquired by the current acquisition unit 12, and the rotor rotation velocity Vmt acquired by the rotation velocity acquisition unit 18. In the present embodiment, the limit torque derivation unit 31 uses a first map stored in the first storage unit 31a to derive a value based on the power supply voltage Vdc, the limit current ILdc, and the rotor rotation velocity Vmt as the limit torque TRLm. The first map will be described later.

The command torque derivation unit 32 derives a command torque TR*, which is a command value of a torque for the brushless motor 100. That is, the command torque derivation unit 32 derives the command torque TR* based on an estimated value TRLd of a load torque of the brushless motor 100, a command rotation velocity Vmt*, which is a command value of the rotor rotation velocity, the rotor rotation velocity Vmt acquired by the rotation velocity acquisition unit 18, and the limit torque TRLm derived by the limit torque derivation unit 31.

Here, for example, a load of the brushless motor 100 tends to increase as the viscosity of the brake fluid circulating in the braking device increases. As a temperature of the brake fluid increases, the viscosity of the brake fluid tends to decrease. For this reason, the estimated value TRLd of the load torque decreases as the temperature of the brake fluid increases.

A description will be given of a processing routine executed by the command torque derivation unit 32 when deriving the command torque TR* with reference to FIG. 2. This processing routine is executed every predetermined control cycle.

In this processing routine, in the first step S11, a deviation ΔVmt between the command rotation velocity Vmt* and the rotor rotation velocity Vmt is calculated. For example, a value obtained by subtracting the rotor rotation velocity Vmt from the command rotation velocity Vmt* is calculated as the deviation ΔVmt. Subsequently, in step S12, a correction torque TRA is calculated by feedback control using the calculated deviation ΔVmt as an input. In the present embodiment, the correction torque TRA is calculated as a sum of a calculated value of a proportional element and a calculated value of an integrating element using the deviation ΔVmt as an input.

Note that as the feedback control, when the correction torque TRA can be calculated based on the deviation ΔVmt, the correction torque TRA may be calculated by a calculation method different from the above calculation method. For example, the correction torque TRA may be calculated as a sum of a calculated value of a proportional element, a calculated value of a differential element, and a calculated value of an integrating element using the deviation ΔVmt as an input.

In the next step S13, a calculation command torque TRTra is calculated as a sum of the estimated value TRLd of the load torque and the calculated correction torque TRA. Subsequently, in step S14, a smaller one of the limit torque TRLm and the calculated calculation command torque TRTra is set as the command torque TR*. That is, in the present embodiment, the command torque TR* is derived within a range that does not exceed the limit torque TRLm. When the command torque TR* is derived, this processing routine is terminated.

Returning to FIG. 1, the command current derivation unit 34 derives the d-axis command current Id* and the q-axis command current Iq* based on the command torque TR* derived by the command torque derivation unit 32, the power supply voltage Vdc acquired by the voltage acquisition unit 11, and the rotor rotation velocity Vmt acquired by the rotation velocity acquisition unit 18. In this instance, since an induced voltage in the brushless motor 100 is suppressed by weak field control, the d-axis command current Id* becomes a negative value. In the present embodiment, the command current derivation unit 34 uses a second map stored in the second storage unit 33 to derive values based on the power supply voltage Vdc, the command torque TR*, and the rotor rotation velocity Vmt as the d-axis command current Id* and the q-axis command current Iq*. That is, the second storage unit 33 corresponds to an example of a "map storage unit" that stores the second map indicating a relationship between the rotor rotation velocity Vmt, the command torque TR*, the power supply voltage Vdc, the d-axis command current Id*, and the q-axis command current Iq*. Note that the second map will be described later.

Figure 3A:
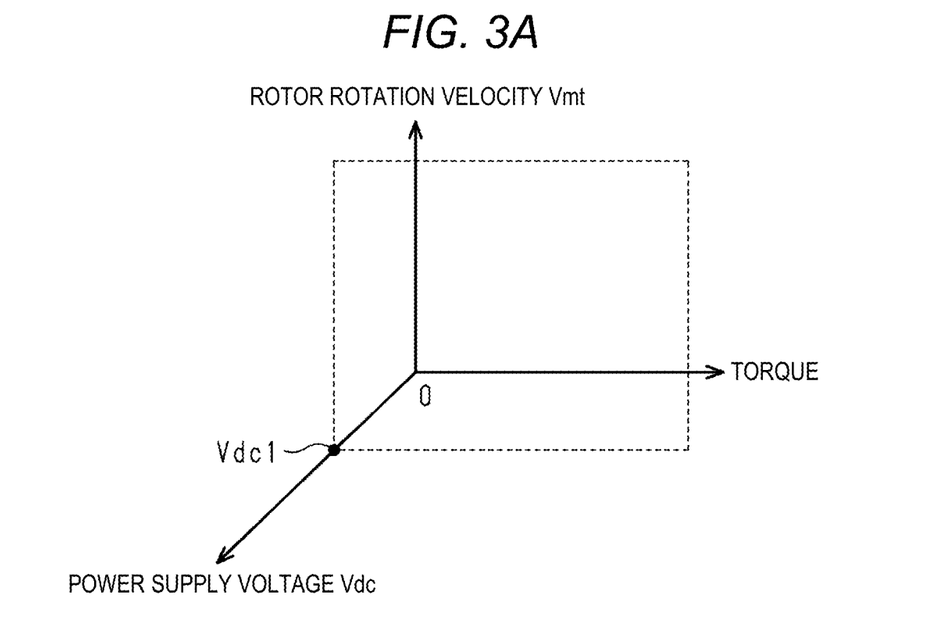
FIGS. 3A and 3B are graphs for description of a first map.

Next, a description will be given of the first map stored in the first storage unit 31a and calculation of the limit torque TRLm using the first map.

As illustrated in FIG. 3A, the first map is a map in which the power supply voltage Vdc, the rotor rotation velocity Vmt, and the torque are set as axes. The first map includes a map for each limit current ILdc.

Figure 3B:
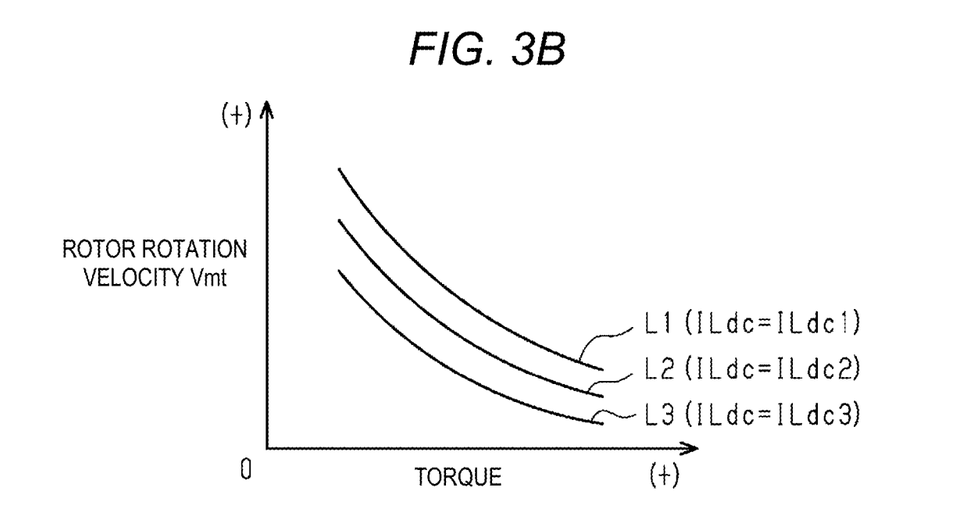

FIG. 3B illustrates a part of the first map surrounded by a broken line in FIG. 3A. That is, FIG. 3B illustrates a relationship between the rotor rotation velocity Vmt, the torque, and the limit current ILdc when the power supply voltage Vdc is a first voltage Vdc1. In FIG. 3B, a line L1 is a line representing a relationship between the rotor rotation velocity Vmt and the torque when the limit current ILdc is a first current ILdc1. A line L2 is a line representing a relationship between the rotor rotation velocity Vmt and the torque when the limit current ILdc is a second current ILdc2. The second current ILdc2 is smaller than the first current ILdc1. A line L3 is a line representing a relationship between the rotor rotation velocity Vmt and the torque when the limit current ILdc is a third current ILdc3. The third current ILdc3 is smaller than the second current ILdc2.

For this reason, using the first map, the limit torque derivation unit 31 can derive a torque corresponding to the power supply voltage Vdc, the rotor rotation velocity Vmt, and the limit current ILdc as the limit torque TRLm. For example, when the power supply voltage Vdc is held at a certain voltage and the rotor rotation velocity Vmt is held at a certain rotation velocity, the limit torque derivation unit 31 sets the limit torque TRLm to a smaller value as the limit current ILdc becomes smaller. Further, when the power supply voltage Vdc is held at a certain voltage and the limit current ILdc is held at a certain current, the limit torque derivation unit 31 sets the limit torque TRLm to a smaller value as the rotor rotation velocity Vmt increases. Furthermore, when the rotor rotation velocity Vmt is held at certain rotation velocity and the limit current ILdc is held at a certain current, the limit torque derivation unit 31 sets the limit torque TRLm to a smaller value as the power supply voltage Vdc becomes lower.

Figure 5:
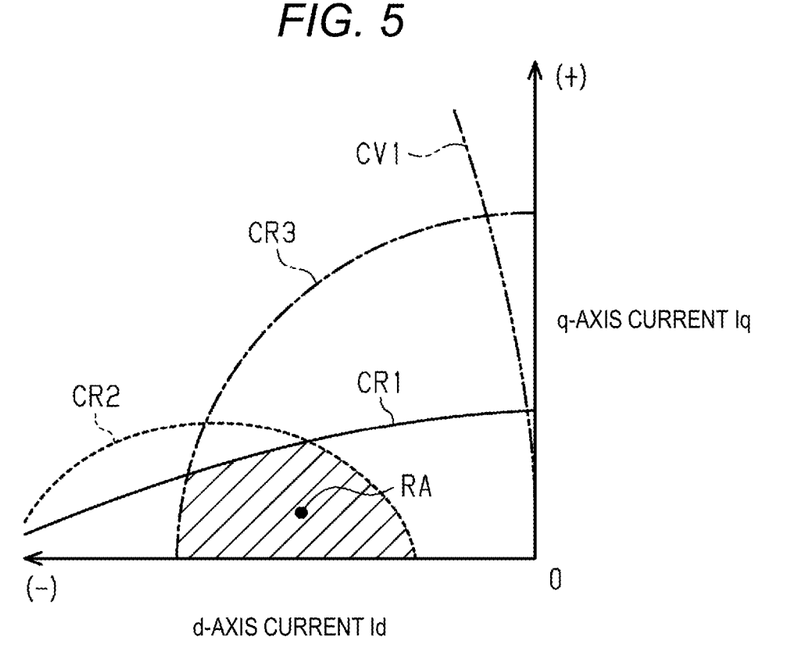
FIG. 5 is a graph illustrating various limit circles and a maximum torque curve.

Incidentally, the first map is a map created in consideration of a power limit circle CR1, a voltage limit circle CR2, a current limit circle CR3, and a maximum torque curve CV1 illustrated in FIG. 5. For this reason, when the limit torque TRLm is calculated using the first map, a point representing the d-axis current Id and the q-axis current Iq corresponding to the limit torque TRLm can be included in a permissible selection region RA in the rotating coordinates. As illustrated in FIG. 5, the term "permissible selection region RA" mentioned herein is a region that satisfies all of being within a region of the power limit circle CR1, being within a region of the voltage limit circle CR2, and being within a region of the current limit circle CR3.

The term "within the region of the limit circle" mentioned herein includes both a line representing an outline of the limit circle and the inside of the line. For example, the region of the power limit circle CR1 includes both a line representing an outline of the power limit circle CR1 and the inside of the line.

Figure 6:
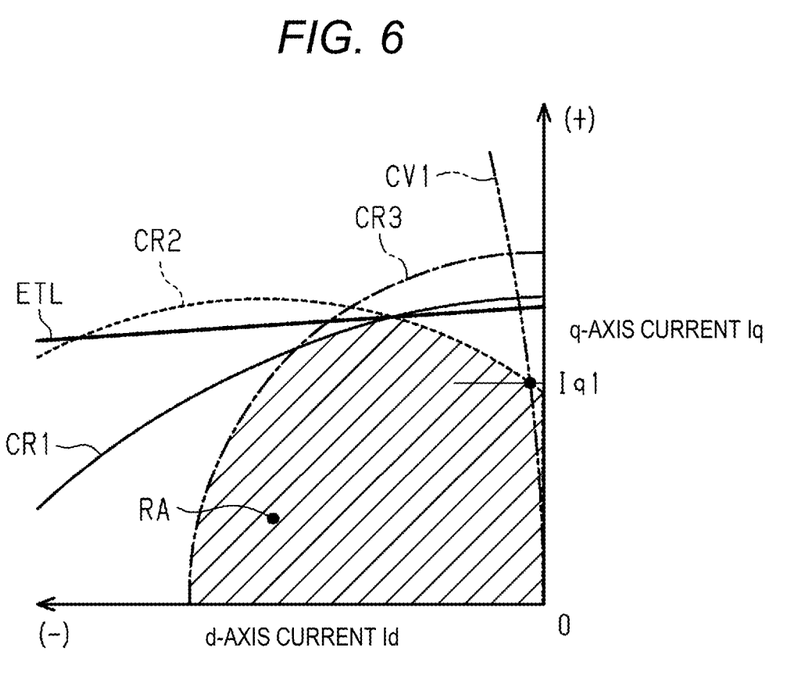
FIG. 6 is a graph illustrating an example of a positional relationship between the various limit circles and the maximum torque curve when a rotor rotation velocity is low.

A positional relationship between the power limit circle CR1, the voltage limit circle CR2, the current limit circle CR3, and the maximum torque curve CV1 changes depending on the rotor rotation velocity Vmt. A graph illustrated in FIG. 6 represents an example of the positional relationship of the power limit circle CR1, the voltage limit circle CR2, the current limit circle CR3, and the maximum torque curve CV1 in the rotating coordinates when the rotor rotation velocity Vmt is relatively low. In the example illustrated in FIG. 6, the maximum torque curve CV1 passes through the permissible selection region RA.

In this case, when the limit torque TRLm is calculated using the first map, in a case where the q-axis current Iq corresponding to the limit torque TRLm is equal to or less than the first q-axis current Iq1, a point representing the d-axis current Id and the q-axis current Iq corresponding to the limit torque TRLm is located on the maximum torque curve CV1. On the other hand, in a case where the q-axis current Iq corresponding to the limit torque TRLm is larger than the first q-axis current Iq1, the point representing the d-axis current Id and the q-axis current Iq corresponding to the limit torque TRLm is located on a line representing an outline of the voltage limit circle CR2.

Figure 7:
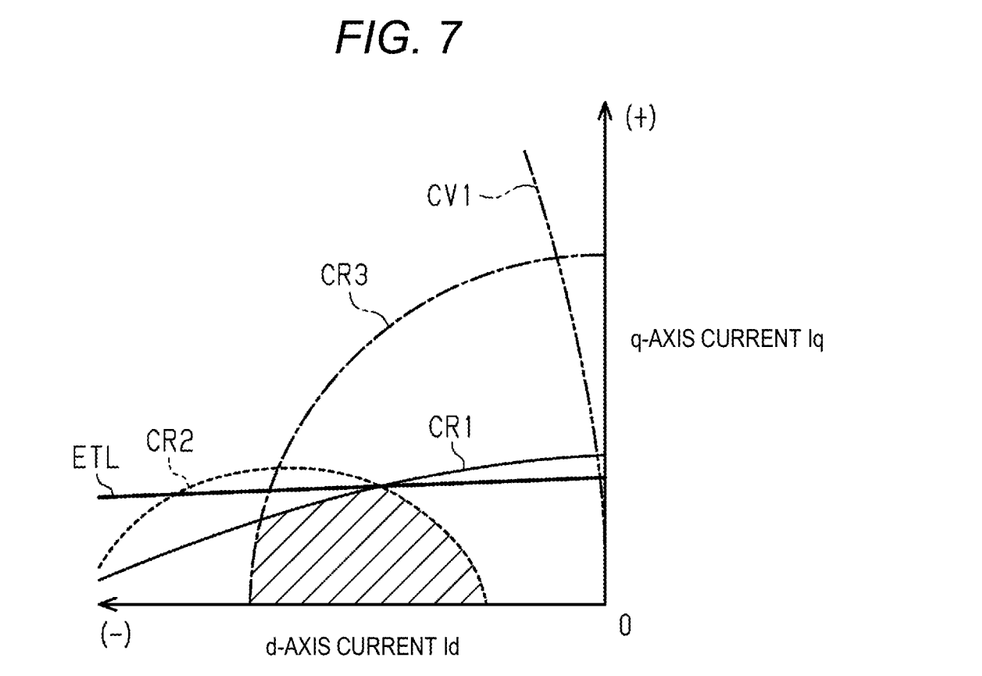
FIG. 7 is a graph illustrating an example of a positional relationship between the various limit circles and the maximum torque curve when the rotor rotation velocity is high.

A graph illustrated in FIG. 7 represents an example of the positional relationship of the power limit circle CR1, the voltage limit circle CR2, the current limit circle CR3, and the maximum torque curve CV1 in the rotating coordinates when the rotor rotation velocity Vmt is relatively high. That is, in a case where the rotor rotation velocity Vmt is relatively high, the power limit circle CR1 becomes smaller and the voltage limit circle CR2 becomes smaller than those of a case where the rotor rotation velocity Vmt is relatively low. For this reason, in the example illustrated in FIG. 7, the maximum torque curve CV1 does not pass through the permissible selection region RA.

In this case, when the limit torque TRLm is calculated using the first map, the point representing the d-axis current Id and the q-axis current Iq corresponding to the limit torque TRLm becomes an intersection of the voltage limit circle CR2 and the power limit circle CR1.

However, depending on the positional relationship between the power limit circle CR1, the voltage limit circle CR2, the current limit circle CR3, and the maximum torque curve CV1, the maximum torque curve CV1 may not pass through the permissible selection region RA, and the voltage limit circle CR2 and the power limit circle CR1 may not intersect with each other. In such a case, when the limit torque TRLm is calculated using the first map, the point representing the d-axis current Id and the q-axis current Iq corresponding to the limit torque TRLm becomes a point where the torque can be maximized in the permissible selection region RA.

Note that each of thick solid lines of FIG. 6 and FIG. 7 is an equal torque line ETL passing through an intersection of the voltage limit circle CR2 and the power limit circle CR1.

Figure 4A:
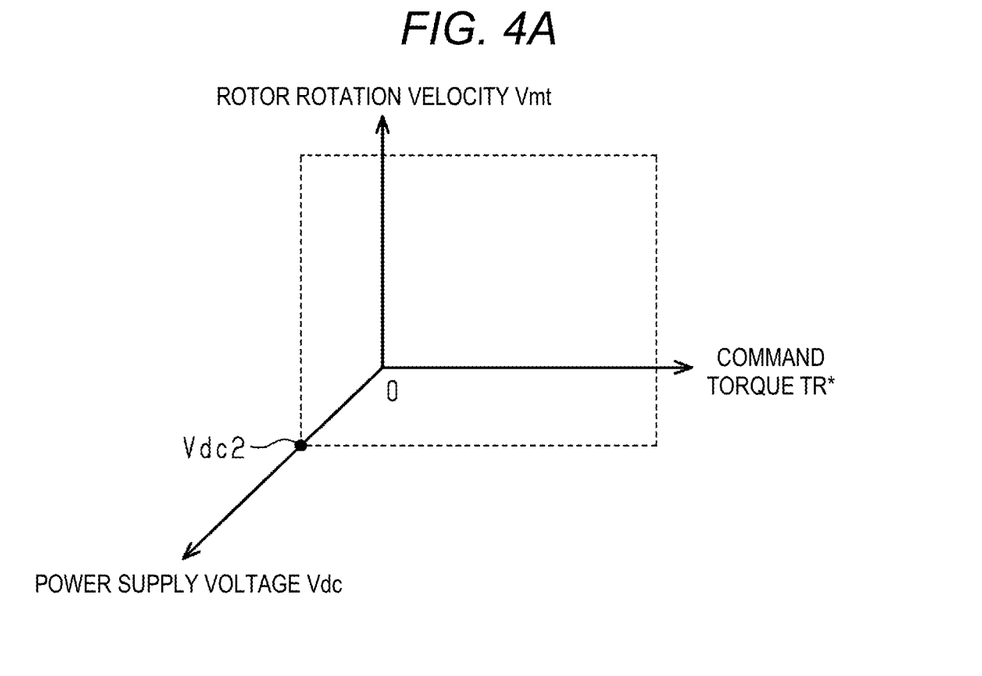
FIGS. 4A and 4B are graphs for description of a second map.

Next, a description will be given of the second map stored in the second storage unit 33 and calculation of the d-axis command current Id* and the q-axis command current Iq* using the second map.

Figure 4B:
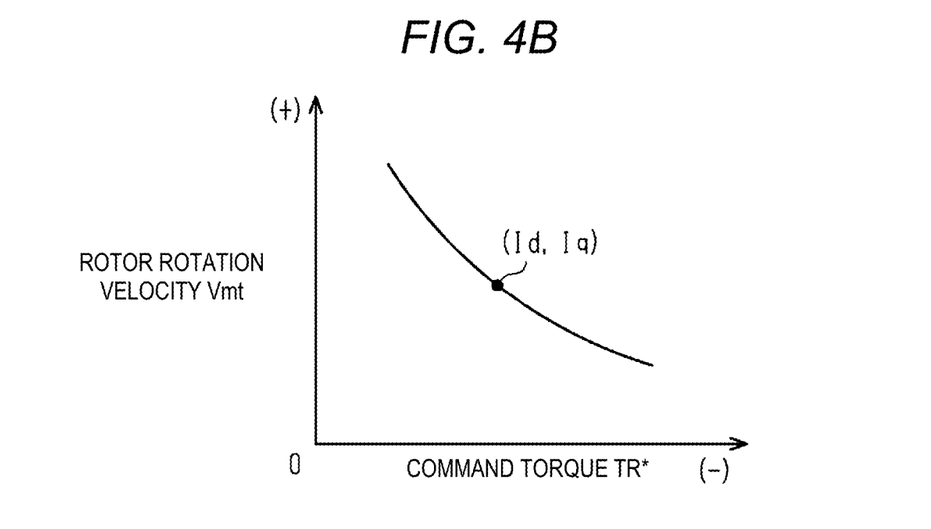

As illustrated in FIG. 4A, the second map is a map in which the power supply voltage Vdc, the rotor rotation velocity Vmt, and the command torque TR* are set as axes. FIG. 4B illustrates a part of the second map surrounded by a broken line in FIG. 4A. That is, FIG. 4B illustrates a relationship between the rotor rotation velocity Vmt, the command torque TR*, the d-axis current Id, and the q-axis current Iq when the power supply voltage Vdc is the second voltage Vdc2.

For this reason, using the second map, the command current derivation unit 34 can derive the d-axis current Id corresponding to the power supply voltage Vdc, the rotor rotation velocity Vmt, and the command torque TR* as the d-axis command current Id*, and derive the q-axis current Iq corresponding to the power supply voltage Vdc, the rotor rotation velocity Vmt, and the command torque TR* as the q-axis command current Iq*.

Similar to the first map, the second map is a map created in consideration of the power limit circle CR1, the voltage limit circle CR2, the current limit circle CR3, and the maximum torque curve CV1. For this reason, when the d-axis command current Id* and the q-axis command current Iq* are calculated using the second map, a command point, which is a point representing the d-axis command current Id* and the q-axis command current Iq*, can be included in the permissible selection region RA in the rotating coordinates. More specifically, the command point can be set to a point where an absolute value of the d-axis current Id is minimized among points for setting an output torque of the brushless motor 100 to the command torque TR* in the permissible selection region RA.

Next, the current limit circle CR3 will be described. The current limit circle CR3 is a circle indicated by an alternate long and short dash line in FIG. 5. The current limit circle CR3 is a current characteristic on the d-axis and the q-axis determined from an upper limit current Idqlimit, which is an upper limit of a current that can be passed through the switching elements included in the inverter 16. For example, the current limit circle CR3 can be expressed as a relational expression (Expression 1) shown below. As is clear from the relational expression (Expression 1), a size of the current limit circle CR3 increases as the upper limit current Idqlimit of the switching elements increases.

$$Id^2 + Iq^2 \leq Idqlimit \quad \ldots (\text{式}_1) \qquad \text{[Formula 1]}$$

(Expression 1)

Next, the voltage limit circle CR2 will be described in detail.

The voltage limit circle CR2 is a circle indicated by a broken line FIG. 5. The voltage limit circle CR2 is a current characteristic on the d-axis and the q-axis based on the power supply voltage Vdc and an angular velocity ωe. For this reason, when at least one of the power supply voltage Vdc and the angular velocity ωe changes, a shape of the voltage limit circle CR2 changes. The voltage limit circle CR2 can be expressed as a relational expression (Expression 5). The relational expression (Expression 5) can be derived using the relational expressions (Expression 2) to (Expression 4) shown below. The relational expression (Expression 2) is an expression representing a relationship between the power supply voltage Vdc, a d-axis voltage Vd which is a value indicating a voltage component in the d-axis direction, and a q-axis voltage Vq which is a value indicating a voltage component in the q-axis direction. The relational expression (Expression 3) is a calculation formula of the d-axis voltage Vd, and the relational expression (Expression 4) is a calculation formula of the q-axis voltage Vq. Note that "Ld" is an inductance of the brushless motor 100 in the d-axis direction, and "Lq" is an inductance of the brushless motor 100 in the q-axis direction. "Ra" is a resistance value of a coil of the brushless motor 100, and "ψa" is the interlinkage magnetic flux (that is, the product of the magnetic flux and the number of coil turns).

$$Vdc^2 = Vd^2 + Vq^2 \ldots \text{(式 2)} \quad \text{[Formula 2]}$$

$$Vd = Ra \cdot Id - Lq \cdot Iq \cdot \omega e \ldots \text{(式 3)}$$

$$Vq = \omega e \cdot Ld \cdot Id + Ra \cdot Iq + \omega e \cdot \psi a \ldots \text{(式 4)}$$

(Expression 2)
(Expression 3)
(Expression 4)

Then, the relational expression (Expression 5) can be derived by using the relational expressions (Expression 3) and (Expression 4) and arranging the relational expression (Expression 2) into an expression of the d-axis current Id. In the relational expression (Expression 5), "A1" can be expressed by a relational expression (Expression 6), "B1" can be expressed by a relational expression (Expression 7), and "C1" can be expressed by a relational expression (Expression 8).

[Formula 3]

$$\frac{-B1 - \sqrt{B1^2 - 4 \cdot A1 \cdot C1}}{2 \cdot A1} \leq Id \leq \frac{-B1 + \sqrt{B1^2 - 4 \cdot A1 \cdot C1}}{2 \cdot A1} \quad (\text{式}5)$$

$$A1 = Ra^2 + Ld^2 \cdot \omega e^2 \quad (\text{式}6)$$

$$B1 = 2 \cdot \omega e \cdot \{Ra \cdot (Ld - Lq) \cdot Iq + \psi a \cdot Ld \cdot \omega e\} \quad (\text{式}7)$$

$$C1 = (Lq^2 \cdot \omega e^2 + Ra^2) \cdot Iq^2 + 2 \cdot \psi a \cdot \omega e \cdot Ra \cdot Iq + \psi a^2 \cdot \omega e^2 - Vdc^2 \quad (\text{式}8)$$

(Expression 5)
(Expression 6)
(Expression 7)
(Expression 8)

The rotor 105 of the brushless motor 100 controlled by the motor control device 10 of the present embodiment has saliency. For this reason, an inductance Ld in the d-axis direction is not the same as an inductance Lq in the q-axis direction. Therefore, the voltage limit circle CR2 becomes an ellipse as indicated by a broken line in FIG. 5.

Next, the power limit circle CR1 will be described in detail.

The power limit circle CR1 is a circle indicated by a solid line in FIG. 5. The power limit circle CR1 is a current characteristic on the d-axis and the q-axis based on the inner product of a voltage vector and a current vector generated in the rotating coordinates of the vector control. The voltage vector includes a voltage component in the d-axis direction and a voltage component in the q-axis direction. Further, the current vector includes a current component in the d-axis direction and a current component in the q-axis direction obtained from a current flowing through the brushless motor 100. The power limit circle CR1 can be expressed as a relational expression (Expression 11). The relational expression (Expression 11) can be derived using the relational expressions (Expression 3), (Expression 4) and (Expression 9). In the relational expression (Expression 9), "VImax" denotes input power which is the power input from the battery 200 to the brushless motor 100, and "cos θ" denotes a power factor. Further, "Idq" denotes the current flowing through the brushless motor 100.

$$V\text{Imax} \geq |\vec{Vdc}| \cdot |\vec{Idq}| \cdot \cos \theta = Vd \cdot Id + Vq \cdot Iq \ldots \text{(式 9)} \quad \text{[Formula 4]}$$

(Expression 9)

The d-axis voltage Vd can be expressed by the relational expression (Expression 3), and the q-axis voltage Vq can be expressed by the relational expression (Expression 4). For this reason, the relational expression (Expression 9) can be converted into the following relational expression (Expression 10).

$$(V\text{Imax} \geq \{\psi a \cdot Iq + (Ld - Lq) \cdot Id \cdot Iq\} \cdot \omega e + (Id^2 + Iq^2) \cdot Ra \ldots (\text{式}_{10}) \quad \text{[Formula 5]}$$

(Expression 10)

Then, a relational expression (Expression 11) can be derived by arranging the relational expression (Expression 10) into an expression of the d-axis current Id. Note that in the expression (Expression 11), "A2" can be expressed by the relational expression (Expression 12), "B2" can be expressed by the relational expression (Expression 13), and "C2" can be expressed by the relational expression (Expression 14).

[Formula 6]

$$\frac{-B2 - \sqrt{B2^2 - 4 \cdot A2 \cdot C2}}{2 \cdot A2} \leq Id \leq \frac{-B2 + \sqrt{B2^2 - 4 \cdot A2 \cdot C2}}{2 \cdot A2} \quad (\text{式}11)$$

$$A2 = Ra \quad (\text{式}12)$$

$$B2 = \omega e \cdot (Ld - Lq) \cdot Iq \quad (\text{式}13)$$

$$C2 = -(V\text{Imax} - \omega e \cdot \psi a \cdot Iq - Iq^2 \cdot Ra) \quad (\text{式}14)$$

(Expression 11)
(Expression 12)
(Expression 13)
(Expression 14)

The rotor 105 of the brushless motor 100 has saliency. For this reason, the inductance Ld in the d-axis direction is not the same as the inductance Lq in the q-axis direction. Therefore, the power limit circle CR1 becomes an ellipse as indicated by a solid line in FIG. 5.

Next, the maximum torque curve CV1 will be described in detail.

The maximum torque curve CV1 is a line indicated by a two-dot chain line in FIG. 5. The maximum torque curve CV1 can be expressed by the following expression (Expression 15).

[Formula 7]

$$Id = \frac{\psi a}{2(Lq - Ld)} - \sqrt{\frac{\psi a^2}{4 \cdot (Lq - Ld)^2} + Iq^2} \quad (\text{式}15)$$

(Expression 15)

Next, the operation and effect of the present embodiment will be described.

(1) In the present embodiment, the second map considering the power limit circle CR1, the voltage limit circle CR2, the current limit circle CR3, and the maximum torque curve CV1 is used to derive the d-axis command current Id* and the q-axis command current Iq*. As a result, the d-axis command current Id* and the q-axis command current Iq* can be derived so that the command point is located inside the power limit circle CR1 and inside the voltage limit circle CR2 in the rotating coordinates. Then, the brushless motor 100 is controlled based on the d-axis command current Id* and the q-axis command current Iq*. For this reason, a divergence is unlikely to occur between the d-axis current Id and the d-axis command current Id*, and a divergence is unlikely to occur between the q-axis current Iq and the q-axis command current Iq*. Therefore, it is possible to suppress a decrease in controllability of the brushless motor 100.

(2) Within the permissible selection region RA, there is a plurality of points where the output torque of the brushless motor 100 can be set as the command torque TR*. In the present embodiment, the d-axis command current Id* and the q-axis command current Iq* are calculated so that the point where the absolute value of the d-axis current Id is minimized becomes the command point among these plurality of points. Then, driving of the brushless motor 100 is controlled based on the d-axis command current Id* and the q-axis command current Iq*. For this reason, it is possible to suppress an increase in power consumption while suppressing a decrease in controllability of the brushless motor 100.

In the command current derivation unit 34, the d-axis command current Id* and the q-axis command current Iq* are derived using the second map prepared in advance. For this reason, the calculation load of the motor control device 10 can be reduced when compared to a case where the d-axis command current Id* and the q-axis command current Iq* are calculated by calculation using various calculation formulas of the limit circles CR1 to CR3.

Note that when the calculation command torque TRTra is equal to or more than the limit torque TRLm, the command torque TR* becomes equal to the limit torque TRLm. Under such circumstances, when the voltage limit circle CR2 and the power limit circle CR1 intersect in the rotating coordinates, the d-axis command current Id* and the q-axis command current Iq* are calculated so that the intersection of the voltage limit circle CR2 and the power limit circle CR1 becomes the command point. Therefore, in the present embodiment, it is possible to regard the d-axis command current Id* and the q-axis command current Iq* as being calculated based on the intersection of the voltage limit circle CR2 and the power limit circle CR1. In this case, a large torque can be output from the brushless motor 100 when compared to a case where the brushless motor 100 is driven based on the d-axis command current Id* and the q-axis command current Iq* determined based on a point other than the intersection.

(3) In a case where the maximum torque curve CV1 passes through the permissible selection region RA when calculating the limit torque TRLm, a torque corresponding to the d-axis current Id and the q-axis current Iq representing a point on the maximum torque curve CV1 is defined as the limit torque TRLm. In addition, when the maximum torque curve CV1 does not pass through the permissible selection region RA, a torque corresponding to the d-axis current Id and the q-axis current Iq representing the intersection of the voltage limit circle CR2 and the power limit circle CR1 is defined as the limit torque TRLm. Meanwhile, when the voltage limit circle CR2 and the power limit circle CR1 do not intersect each other, a torque corresponding to the d-axis current Id and the q-axis current Iq representing a point in the permissible selection region RA where the torque can be maximized is defined as the limit torque TRLm.

That is, in the present embodiment, based on the power limit circle CR1, the voltage limit circle CR2, the current limit circle CR3, and the maximum torque curve CV1, the maximum value of the torque that can be output from the brushless motor 100 at that time is defined as the limit torque TRLm. The command torque TR* is calculated based on the limit torque TRLm calculated in this way. For this reason, an event in which the rotor rotation velocity Vmt cannot be increased up to the command rotation velocity Vmt* is less likely to occur.

Note that the limit torque TRLm is calculated using the first map prepared in advance. For this reason, the calculation load of the motor control device 10 can be reduced when compared to a case where the limit torque TRLm is calculated by calculation using the various calculation formulas of the limit circles CR1 to CR3.

(4) The command torque TR*, that is, the calculation command torque TRTra is calculated using the estimated value TRLd of the load torque of the brushless motor 100. In this way, when compared to a case where the command torque TR*, that is, the calculation command torque TRTra is calculated by feedback control in which the deviation ΔVmt between the command rotation velocity Vmt* and the rotor rotation velocity Vmt is input without using the estimated value TRLd of the load torque, it is possible to suppress a delay in the change in the command torque TR* with respect to the change in the command rotation velocity Vmt*. As a result, when the command rotation velocity Vmt* is changed, it is possible to suppress a response delay of the change in the rotor rotation velocity Vmt with respect to the change in the command rotation velocity Vmt*.

The embodiment can be modified and implemented as follows. The embodiment and the following modifications can be implemented in combination with each other within a technically consistent range.

When the limit torque TRLm can be calculated in consideration of the power limit circle CR1, the voltage limit circle CR2, the current limit circle CR3, and the maximum torque curve CV1, the limit torque TRLm may be derived without using a map as in the embodiment. For example, the limit torque TRLm may be calculated by calculation using various calculation formulas of the limit circles CR1 to CR3.

In the embodiment, the limit torque TRLm is derived so that a maximum value of a torque assumed based on the positional relationship between the power limit circle CR1, the voltage limit circle CR2, the current limit circle CR3, and the maximum torque curve CV1 at that time becomes the limit torque TRLm. However, when a torque corresponding to a point in the permissible selection region RA at that time can be set as the limit torque TRLm, a value different from the maximum value of the torque assumed based on the positional relationship may be set as the limit torque TRLm. For example, a value slightly smaller than the maximum value of the torque assumed based on the positional relationship may be set as the limit torque TRLm.

When the d-axis command current Id* and the q-axis command current Iq* can be derived in consideration of the power limit circle CR1, the voltage limit circle CR2, the current limit circle CR3, and the maximum torque curve CV1, the d-axis command current Id* and the q-axis command current Iq* may be derived without using the map as in the embodiment. For example, the d-axis command current Id* and the q-axis command current Iq* may be calculated by calculation using various formulas of the limit circles CR1 to CR3.

In the embodiment, the d-axis command current Id* and the q-axis command current Iq* may be derived so that a point where the absolute value of the d-axis current Id is minimized becomes the command point among points where the output torque of the brushless motor 100 can be set as the command torque TR* in the permissible selection region RA at that time. However, when the point where the output torque of the brushless motor 100 can be set as the command torque TR* can be set as the command point within the permissible selection region RA at that time, a point different from the point where the absolute value of the d-axis current Id is minimized may be set as the command point.

A process for acquiring the rotor rotation velocity Vmt may be a process for calculating the rotor rotation velocity Vmt by a method different from the acquisition process described in the embodiment.

When a rate of change of the rotor rotation velocity Vmt is low, the calculation command torque TRTra may be calculated without using the estimated value TRLd of the load torque of the brushless motor 100. In this case, a value calculated by the feedback control in which the deviation ΔVmt between the command rotation velocity Vmt* and the rotor rotation velocity Vmt is input is used as the calculation command torque TRTra.

The calculation command torque TRTra may be set to the command torque TR*. In this case, it is preferable to derive a limit value of the d-axis command current Id* and a limit value of the q-axis command current Iq* based on the power limit circle CR1, the voltage limit circle CR2, and the current limit circle CR3. Then, one of the limit values of the d-axis current Id and the d-axis command current Id* based on the command torque TR* having a smaller absolute value may be set as the d-axis command current Id*, and one of the limit values of the q-axis current Iq and the q-axis command current Iq* based on the command torque TR* having a smaller absolute value may be set as the q-axis command current Iq*.

When the voltage limit circle CR2 and the power limit circle CR1 intersect in the rotating coordinates, the d-axis command currents Id* and the q-axis command current Iq* may be derived so that the intersection of the voltage limit circle CR2 and the power limit circle CR1 becomes the command point, and the brushless motor 100 may be driven based on the d-axis command current Id* and the q-axis command current Iq*. In this case, the output torque of the brushless motor 100 can be set to a maximum value at that time or a value in the vicinity of the maximum value.

The motor control device 10 may be configured as one or more processors that operate according to a computer program (software), one or more dedicated hardware circuits such as a dedicated hardware that executes at least a part of various processes (application specific IC: ASIC), or a circuit including a combination thereof. The processor includes a CPU and a memory such as a RAM and a ROM, and the memory stores a program code or a command configured to cause the CPU to execute a process. The memory, that is, a storage medium includes any available medium accessible by a general purpose or dedicated computer.

The rotor 105 of the brushless motor 100 may not have saliency. In this case, the inductance Ld in the d-axis direction is the same as the inductance Lq in the q-axis direction. For this reason, both the voltage limit circle CR2 and the power limit circle CR1 are perfect circles.

The rotor 105 applied to the brushless motor 100 may be a 4-pole rotor instead of a 2-pole rotor.

The brushless motor to which the motor control device 10 is applied may be a power source of an actuator different from the in-vehicle braking device.

The invention claimed is:

1. A motor control device for driving a brushless motor based on a d-axis command current which is a current command value in a direction of a d-axis of rotating coordinates of vector control, and a q-axis command current which is a current command value in a direction of a q-axis of the rotating coordinates, the motor control device comprising:
   a current acquisition unit that acquires a current flowing through the brushless motor by supplying power from a power supply;
   a voltage acquisition unit that acquires a power supply voltage applied to the brushless motor from the power supply; and
   a command current determination unit that determines the d-axis command current and the q-axis command current,
   wherein the command current determination unit determines the d-axis command current and the q-axis command current based on a power limit circle which is a current characteristic on the d-axis and the q-axis based on an inner product of a voltage vector including a voltage component in the direction of the d-axis and a voltage component in the direction of the q-axis and a current vector including a current component in the direction of the d-axis and a current component in the direction of the q-axis obtained from a current flowing through the brushless motor, and a voltage limit circle which is a current characteristic on the d-axis and the q-axis based on the power supply voltage and an angular velocity of the brushless motor.

2. The motor control device according to claim 1, wherein when the voltage limit circle and the power limit circle intersect each other, the command current determination unit determines the d-axis command current and the q-axis command current based on an intersection of the voltage limit circle and the power limit circle.

3. The motor control device according to claim 1 or 2, wherein the command current determination unit includes
   a limit torque derivation unit that derives a limit torque which is a limit value of a torque for the brushless motor, based on the voltage limit circle and the power limit circle,
   a command torque derivation unit that derives a command torque within a range not exceeding the limit torque, and
   a command current derivation unit that derives the d-axis command current and the q-axis command current based on the command torque.

4. The motor control device according to claim 3, further comprising
   a rotation velocity acquisition unit that acquires a rotation velocity of a rotor of the brushless motor,
   wherein the command torque derivation unit
   derives a correction torque by feedback control based on a command value of the rotation velocity of the rotor and the rotation velocity of the rotor, and
   sets one of a sum of a load torque of the brushless motor and the correction torque and the limit torque having a smaller value as the command torque.

5. The motor control device according to claim 3, further comprising
   a rotation velocity acquisition unit that acquires a rotation velocity of a rotor of the brushless motor,
   wherein the command current determination unit includes
   a map storage unit that stores a map indicating a relationship between the rotation velocity of the rotor, the command torque, the power supply voltage, the d-axis command current, and the q-axis command current, and
   the command current derivation unit uses the map to derive the d-axis command current and the q-axis command current based on the command torque, the rotation velocity of the rotor, and the power supply voltage.

6. The motor control device according to claim 2, wherein the command current determination unit includes a limit torque derivation unit that derives a limit torque which is a limit value of a torque for the brushless motor, based on the voltage limit circle and the power limit circle, a command torque derivation unit that derives a command torque within a range not exceeding the limit torque, and a command current derivation unit that derives the d-axis command current and the q-axis command current based on the command torque.

7. The motor control device according to claim 6, further comprising a rotation velocity acquisition unit that acquires a rotation velocity of a rotor of the brushless motor, wherein the command torque derivation unit derives a correction torque by feedback control based on a command value of the rotation velocity of the rotor and the rotation velocity of the rotor, and sets one of a sum of a load torque of the brushless motor and the correction torque and the limit torque having a smaller value as the command torque.

8. The motor control device according to claim 4, further comprising a rotation velocity acquisition unit that acquires a rotation velocity of a rotor of the brushless motor, wherein the command current determination unit includes a map storage unit that stores a map indicating a relationship between the rotation velocity of the rotor, the command torque, the power supply voltage, the d-axis command current, and the q-axis command current, and the command current derivation unit uses the map to derive the d-axis command current and the q-axis command current based on the command torque, the rotation velocity of the rotor, and the power supply voltage.

9. The motor control device according to claim 6, further comprising a rotation velocity acquisition unit that acquires a rotation velocity of a rotor of the brushless motor, wherein the command current determination unit includes a map storage unit that stores a map indicating a relationship between the rotation velocity of the rotor, the command torque, the power supply voltage, the d-axis command current, and the q-axis command current, and the command current derivation unit uses the map to derive the d-axis command current and the q-axis command current based on the command torque, the rotation velocity of the rotor, and the power supply voltage.

10. The motor control device according to claim 7, further comprising a rotation velocity acquisition unit that acquires a rotation velocity of a rotor of the brushless motor, wherein the command current determination unit includes a map storage unit that stores a map indicating a relationship between the rotation velocity of the rotor, the command torque, the power supply voltage, the d-axis command current, and the q-axis command current, and the command current derivation unit uses the map to derive the d-axis command current and the q-axis command current based on the command torque, the rotation velocity of the rotor, and the power supply voltage.

* * * * *